United States Patent
Joachimsthaler et al.

(10) Patent No.: US 10,935,397 B2
(45) Date of Patent: Mar. 2, 2021

(54) POSITION-MEASURING DEVICE AND METHOD FOR OPERATING A POSITION-MEASURING DEVICE

(71) Applicant: DR. JOHANNES HEIDENHAIN GmbH, Traunreut (DE)

(72) Inventors: Ingo Joachimsthaler, Traunstein (DE); Sebastian Lenz, Garching an der Alz (DE); Thomas Geisler, Surberg (DE); Johannes Soier, Heldenstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 310 days.

(21) Appl. No.: 16/121,663

(22) Filed: Sep. 5, 2018

(65) Prior Publication Data

US 2019/0086241 A1    Mar. 21, 2019

(30) Foreign Application Priority Data

Sep. 20, 2017   (DE) .................. 10 2017 216 666.5

(51) Int. Cl.
| | |
|---|---|
| *G01D 5/244* | (2006.01) |
| *G01D 5/245* | (2006.01) |
| *B23Q 17/22* | (2006.01) |
| *B25J 19/02* | (2006.01) |

(52) U.S. Cl.
CPC ....... *G01D 5/24476* (2013.01); *G01D 5/2451* (2013.01); *G01D 5/24485* (2013.01); *G01D 5/24495* (2013.01); *B23Q 17/22* (2013.01); *B25J 19/021* (2013.01)

(58) Field of Classification Search
CPC .......... G01D 5/24476; G01D 5/24485; G01D 5/24495; G01D 5/2451; G01B 21/00
See application file for complete search history.

(56) References Cited

U.S. PATENT DOCUMENTS

| | | |
|---|---|---|
| 5,659,136 A | 8/1997 | Koch et al. |
| 8,135,977 B2 | 3/2012 | Francescon et al. |
| 8,459,117 B2 | 6/2013 | Gustafsson |

(Continued)

FOREIGN PATENT DOCUMENTS

| | | |
|---|---|---|
| DE | 19539633 A1 | 4/1997 |
| EP | 2375221 A2 | 10/2011 |
| EP | 2690737 A1 | 1/2014 |

*Primary Examiner* — David Z Huang
(74) *Attorney, Agent, or Firm* — Leydig, Voit & Mayer Ltd.

(57) ABSTRACT

A position-measuring device includes a graduation carrier having a measuring graduation disposed thereon. At least one position sensor is configured to generate position-dependent measurement signals by scanning the measuring graduation. A processor is configured to process the position-dependent measurement signals into position signals. An interface is configured to transmit the position signals to subsequent electronics via at least one data channel. At least one motion sensor is configured to generate time-varying measurement signals. A signal analyzer is configured to analyze the measurement signals in the frequency domain dependent on parameters that are transmittable from the subsequent electronics to the interface unit, and to produce result data that is transmittable from the interface unit to the subsequent electronics.

16 Claims, 8 Drawing Sheets

(56) References Cited

U.S. PATENT DOCUMENTS

| | | | |
|---|---|---|---|
| 9,202,611 B2 | 12/2015 | Stemmle et al. | |
| 2011/0041585 A1* | 2/2011 | Hiller | G01D 5/2451 |
| | | | 73/1.79 |
| 2012/0136625 A1* | 5/2012 | Joachimsthaler | G01D 5/2457 |
| | | | 702/150 |
| 2015/0032389 A1* | 1/2015 | Hedin | G01M 13/045 |
| | | | 702/34 |
| 2016/0169709 A1* | 6/2016 | von Berg | H04L 1/243 |
| | | | 702/182 |

* cited by examiner

POSITION-MEASURING DEVICE AND METHOD FOR OPERATING A POSITION-MEASURING DEVICE

CROSS-REFERENCE TO PRIOR APPLICATION

Priority is claimed to German Patent Application No. DE 10 2017 216 666.5, filed on Sep. 20, 2017, the entire disclosure of which is hereby incorporated by reference herein.

FIELD

The present invention relates to a position-measuring device, and to a method for operating a position-measuring device. In particular, the present invention relates to the analysis of time-varying measurement signals from sensors in the frequency domain.

BACKGROUND

Position-measuring devices are used in automation technology, and especially in machine tools, to measure positions or changes in position of moving parts. Rotary encoders or angle-measuring devices, for example, measure rotational movements of, for example, rotating shafts. In contrast, length-measuring devices measure linear displacements of machine parts that are movable relative to each other.

A general distinction is made between incremental-type and absolute-type position-measuring devices, with different physical measurement principles being used, such as optical, magnetic, inductive or capacitive measurement principles.

Incremental-type position-measuring devices generate position signals by scanning an incremental graduation track disposed on a graduation carrier. An incremental graduation track has graduation elements which are arranged regularly in a measurement direction and which, in the case of the optical scanning principle, are a sequence of transparent and opaque graduation lines. Due to the measurement principle, this type of measurement is a relative one because the scanning signals of the individual graduation periods are indistinguishable. The position measurement is performed by counting signal periods or fractions of signal periods. In order to establish an absolute reference point, usually an additional graduation track having a reference pattern is provided, the scanning of which produces what is referred to as a reference pulse at a defined position. This reference pulse establishes a reference point for the position measurement.

In the case of absolute-type position-measuring devices, the graduation track has an absolute code, so that an absolute position value can be determined at any time by scanning the graduation track.

The incremental position signals or absolute position values are fed to subsequent electronics for further processing. If the machine in which the position-measuring device is used is a machine tool, then the subsequent electronics is a numerical control system, for example.

Because position-measuring devices are mechanically coupled to the machine in which they are used, interactions ensue. For example, mechanical vibrations of the machine in the vicinity of the position-measuring devices can influence them and reduce the quality of the position signals and thus the measurement accuracy. The quality of the position signals, in turn, affects the accuracy of drive control circuits in which the position signals are used as actual position values. In order to optimize the machine, one needs to understand such interactions. One way to achieve this is by performing a frequency analysis on the position signals or values in the subsequent electronics. Frequently, additional sensors, such as, for example, acceleration sensors, are used to assist in the achievement of this objective. However, particularly in the case of absolute position-measuring devices, this approach is limited by the bandwidth constraints of the digital interfaces used for transmission of the position and sensor values.

EP 2 375 221 A2 proposes to perform a frequency analysis on the measurement values of acceleration sensors already in the position-measuring device and to draw conclusions therefrom about loads acting on the position-measuring device.

SUMMARY

In an embodiment, the present invention provides a position-measuring device including a graduation carrier having a measuring graduation disposed thereon. At least one position sensor is configured to generate position-dependent measurement signals by scanning the measuring graduation. A processor is configured to process the position-dependent measurement signals into position signals. An interface is configured to transmit the position signals to subsequent electronics via at least one data channel. At least one motion sensor is configured to generate time-varying measurement signals. A signal analyzer is configured to analyze the measurement signals in the frequency domain dependent on parameters that are transmittable from the subsequent electronics to the interface unit, and to produce result data that is transmittable from the interface unit to the subsequent electronics.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide an improved solution for analyzing mechanical vibrations in the vicinity of a position-measuring device.

According to an embodiment, a position-measuring device comprises:
- a graduation carrier having a measuring graduation provided thereon,
- at least one position sensor capable of generating position-dependent measurement signals by scanning the measuring graduation,
- a processing unit capable of processing the position-dependent measurement signals into position signals, and
- an interface unit for transmitting the position signals to subsequent electronics via at least one data channel,
- the position-measuring device having associated therewith at least one motion sensor that generates time-varying measurement signals which are fed to a signal analysis unit capable of analyzing the measurement signals in the frequency domain, this analysis being dependent on parameters that are transmittable from the subsequent electronics to the interface unit, and result data resulting from analysis of the measurement signals being transmittable from the interface unit to the subsequent electronics.

Another embodiment of the present invention provide a method for operating a position-measuring device according to embodiments of the present invention.

According to an embodiment, a method for operating the position-measuring device comprises the following steps:
- transmitting parameters from the subsequent electronics to the position-measuring device,
- determining result data in signal analysis unit (50) by analyzing the measurement signals, taking into account the parameters, and
- transmitting the result data to the subsequent electronics.

Figure 1:
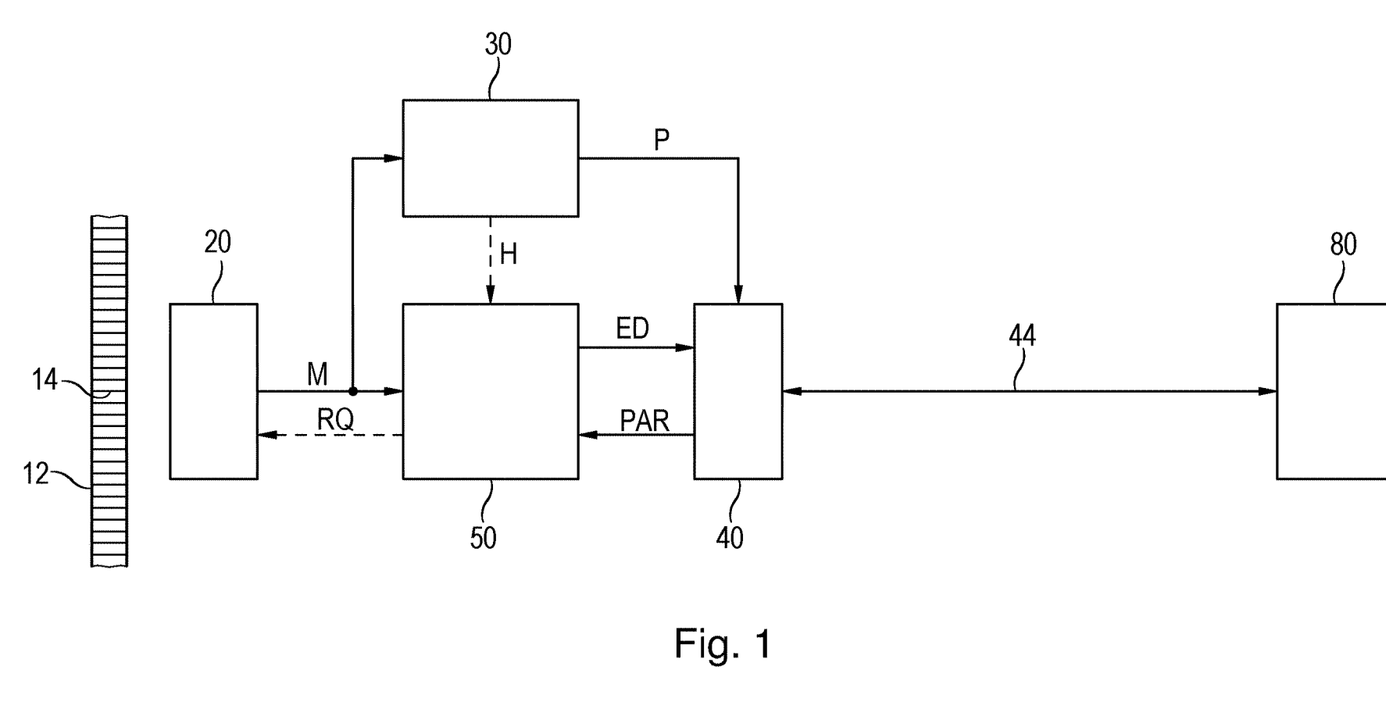
FIG. 1 shows a block diagram of a position-measuring device according to an embodiment of the present invention.

FIG. 1 shows a block diagram of a position-measuring device 10 according to the present invention. In order to provide the basic functionality (measuring, processing and outputting position-dependent signals), position-measuring device 10 includes a graduation carrier 12 having a measuring graduation 14, at least one position sensor 20, a processing unit 30, as well as an interface unit 40.

In accordance with an embodiment of the present invention, position-measuring device 10 includes at least one motion sensor. Motion sensors are sensors that sense movements of position-measuring device 10 or of parts thereof and convert them into electrical signals. The motion sensors may be disposed inside or outside of a housing of position-measuring device 10. In this first exemplary embodiment, the at least one motion sensor is position sensor 20, which, in accordance with the intended purpose thereof, detects positions or changes in position of parts of position-measuring device 10 that are movable relative to each other. As will be illustrated below with reference to FIGS. 8 and 9, motion sensors may also be provided by sensors which are independent of position measurement. This is true, for example, for acceleration sensors and structure-borne sound sensors.

In the present example, position sensor 20 is suitably adapted for scanning measuring graduation 14 on graduation carrier 12. Graduation carrier 12 and position sensor 20 are disposed in known manner so as to be movable relative to each other in a measurement direction, for example by being attached to moving parts of a machine tool whose relative position is to be determined.

Embodiments of the present invention provide that the position-measuring device can be a length-measuring device or an angle-measuring device (rotary encoder). Accordingly, graduation carrier 12 may be a straight scale having a measuring graduation 14 arranged along the direction of the scale, or a circular disk having a measuring graduation 14 arranged radially about a center of rotation of the disk.

Position-dependent measurement signals M resulting from the scanning of measuring graduation 14 are fed to processing unit 30. Measurement signals M may include analog or digitally coded signals. Processing unit 30 processes measurement signals M into position signals P and outputs them to interface unit 40. The processing may include steps such as signal correction, digitization, etc.

Measurement signals M are also fed to a signal analysis unit 50 suitably adapted calculating and analyzing the frequency components included in measurement signals M in at least one frequency band. In particular, if measurement signals M are digitally coded signals capable of being output by position sensor 20 via a digital interface, a request signal RQ may be fed to position sensor 20 to cause output of a current position value.

The calculation may be done using any mathematical analysis method suitable for performing a transformation of a time-varying signal into the frequency domain, such as, for example, a fast Fourier transform (FFT) and methods derived therefrom. An algorithm particularly suited for calculating frequency components of specific frequencies is the Goertzel algorithm. Another option is to use a digital filter and to calculate the root-means-square from the filtered data.

Result data ED resulting from the signal analysis can also be fed to interface unit 40.

Interface unit 40 of position-measuring device 10 is used for communication with subsequent electronics 80. It has a bidirectional data channel 44 via which, in accordance with the present invention, parameters PAR can be transmitted from subsequent electronics 80 to position-measuring device 10 and result data ED can be transmitted in the form of serial data packets in the opposite direction to subsequent electronics 80. Parameters PAR are fed to signal analysis unit 50.

Moreover, interface unit 40 is suitably adapted for transmitting position signals P of the at least one position sensor 20 to subsequent electronics 80. In particular, in the case of position-measuring devices that generate absolute position values, this may also occur via data channel 44. To this end, a common transmission protocol may be used.

Alternatively, however, there may be provided an additional data channel, for example, if position-measuring device 10 is an incremental position-measuring apparatus in which position signals P are output in the form of analog or digital signals that are phase-shifted with respect to each other.

Also, in addition to the inventive data channel 44, a further digital data channel may be provided which allows for independent communication with subsequent electronics 80 or further subsequent electronics different from subsequent electronics 80, in particular to transmit position signals P (in digitally coded form). Thus, two digital interfaces are available, one of which may be used for operating the position-measuring device in accordance with its intended purpose (measuring and transmitting position values), and the other of which may be used to provide the inventive function (signal analysis of measurement signals). Advantageously, the interfaces are also mechanically separated and may use different transmission protocols.

If measuring graduation 14 is an incremental graduation, then position-dependent measurement signals M are periodic; i.e., the waveform repeats itself with each graduation period. The signal frequency of measurement signals M is determined by the relative movement between graduation carrier 12 and position sensor 20 and by the graduation period of measuring graduation 14. In most cases, at least two position-dependent measurement signals M are generated which are phase-shifted with respect to each other, for example, by 90°. This makes it possible to determine the direction of movement. In most incremental position-measuring devices, measuring graduation 14 and position sensor 20 are matched such that, under ideal conditions and at a constant velocity of movement between graduation carrier 12 and position sensor 20, measurement signals M are exactly sinusoidal. Therefore, a frequency spectrum of measurement signals M has a signal peak at exactly one frequency. Such position-measuring devices are mostly based on an optical or magnetic scanning principle.

Position-measuring devices in which changes in position result in a modulation of a carrier signal (also referred to as "field-modulating position-measuring devices") are also widespread in automation technology. Here, the frequency spectrum of measurement signal M shows signal peaks at two frequencies: that of the carrier signal and that generated by the change in position. Such position-measuring devices are based on inductive or capacitive scanning principles.

In position-measuring devices in which position determination is based on scanning of an absolutely coded measuring graduation, it is also possible to determine frequency spectra, for example by measuring position values at equal time intervals and determining and analyzing each change in position in relation to the previous measurement. It holds here that, under ideal conditions and at a constant velocity of movement, no signal peaks occur in the frequency spectrum because the changes in position must yield a constant value.

Figure 2:
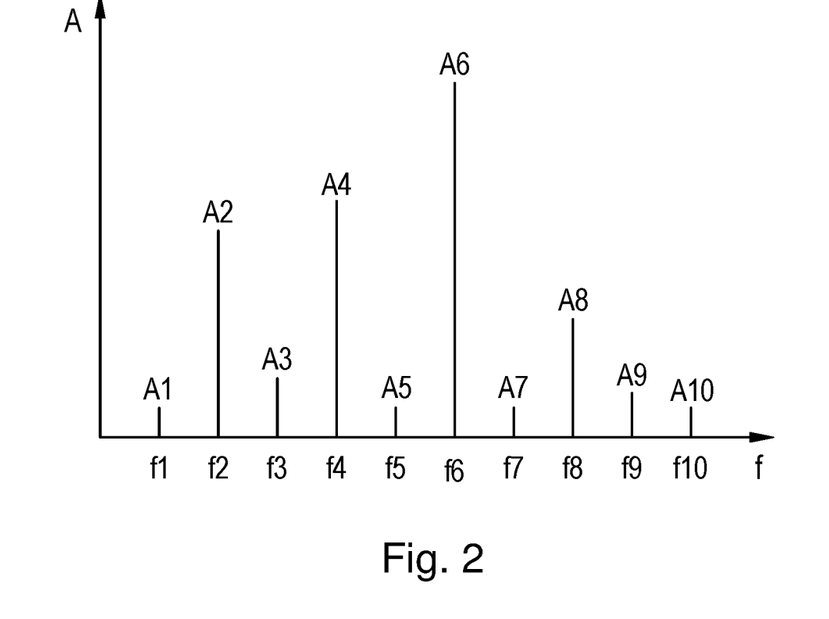
FIG. 2 shows a frequency spectrum in the form of an amplitude spectrum of the measurement signals of a position sensor.

If, besides the expected signal peaks, the frequency spectrum of position-dependent measurement signals M also shows signal peaks at other frequencies, then this may indicate a malfunction or disturbing external influences. FIG. 2 shows, by way of example, a frequency spectrum in the form of an amplitude spectrum of measurement signals M of a position sensor 20 of an incremental position-measuring device at a constant movement. The spectrum shows signal peaks at frequencies f1 through f10 with amplitude values A1 through A10. The signal peak at frequency f6 has the largest amplitude A6 and corresponds, for example, to the signal frequency of the position signals. Besides this signal peak, no other significant signal peak should occur in the frequency spectrum during disturbance-free operation. Therefore, the signal peaks at frequencies f1 through f5 and f7 through f10 are caused by disturbances.

Generally speaking, disturbances which manifest themselves as signal peaks in the frequency spectrum may result from both internal and external boundary conditions, operating conditions and fault conditions. Internal causes include, for example, tolerances or malfunctions in the bearing of the moving components of the position-measuring device (bearing of the encoder shaft of a rotary encoder or of the scanning head of a length-measuring device).

Depending on the application of the position-measuring device, external disturbances can have various causes, including, for example:
- magnetic cogging forces of a drive motor having a drive shaft encoder coupled thereto,
- tolerances and malfunctions in axis bearing assemblies outside the position-measuring device,
- mutual interference between axis drives in multi-axis machine tools,
- mounting errors of the position-measuring device;
- wear of machine parts or, in the case of machine tools, of a tool, or
- the load condition of a drive motor, in particular during machining of a workpiece in a machine tool.

Since in automation technology, and especially in machine tools, position-measuring devices are generally used to acquire position information for control circuits for controlling drives, mutual interference between cause and effect may ensue; i.e., the cause of a disturbance affects the position measurement, which in turn influences the control circuit (resonance effects). Conversely, this means that conclusions can be drawn about the causes of disturbances by analyzing position-dependent measurement signals M in the frequency domain. This knowledge can in turn be used to optimize the overall system.

In accordance with an embodiment of the present invention, in order to allow disturbances to be detected and monitored in the most effective way possible, signal analysis unit 50 is designed to be parameterizable. As will be shown in the following exemplary embodiments, parameterizability may refer to both the execution of the signal analysis and the scope of the signal analysis.

Figure 3:
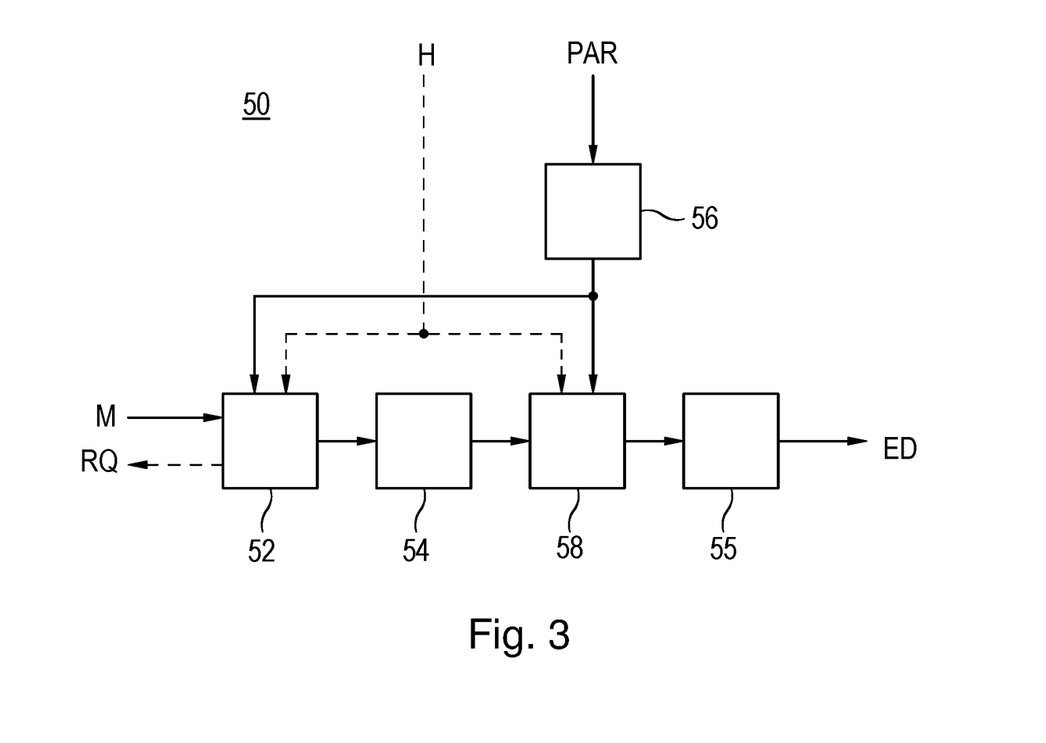
FIG. 3 depicts a first embodiment of a signal analysis unit.

In this regard, FIG. 3 depicts a first embodiment of a signal analysis unit 50, which includes a data acquisition unit 52, an input memory 54, an output memory 55, a parameter memory 56, and an arithmetic logic unit 58.

Parameter memory 56 is used for storing parameters PAR. From there, they can be retrieved by arithmetic logic unit 58 and also by data acquisition unit 52 where necessary.

Data acquisition unit 52 is used for acquiring current measurement values of measurement signals M at constant time intervals. The time intervals may be derived from a clock signal which is available to signal analysis unit 50 and which also controls the processes in arithmetic logic unit 58, for example. The clock signal may come from a quartz-controlled clock generator or a PLL. If measurement signals M are analog signals, then data acquisition unit 52 includes an analog-to-digital converter for converting instantaneous values of measurement signals M into digital measurement values. These can be stored in input memory 54. However, if measurement signals M are already digitally coded, then data acquisition unit 52 includes an interface for reading in current measurement values and storing them in input memory 54. To this end, a request signal RQ may be output to position sensor where necessary.

The acquisition and storage of measurement values may be performed continuously or in a command-controlled manner via a parameter PAR. In the case of continuous acquisition of measurement values, input memory 54 is advantageously configured as a circular buffer in which old measurement values are cyclically overwritten.

Arithmetic logic unit 58 is suitably adapted to calculate, from the measurement values in input memory 54, a frequency spectrum, in particular an amplitude spectrum, in at least one frequency band or over the entire bandwidth of the input signals to determine result data ED therefrom, based on parameters PAR stored in parameter memory 56. Result data ED can be stored in output memory 55 and output therefrom via interface unit 40 to subsequent electronics 80.

Figure 4:
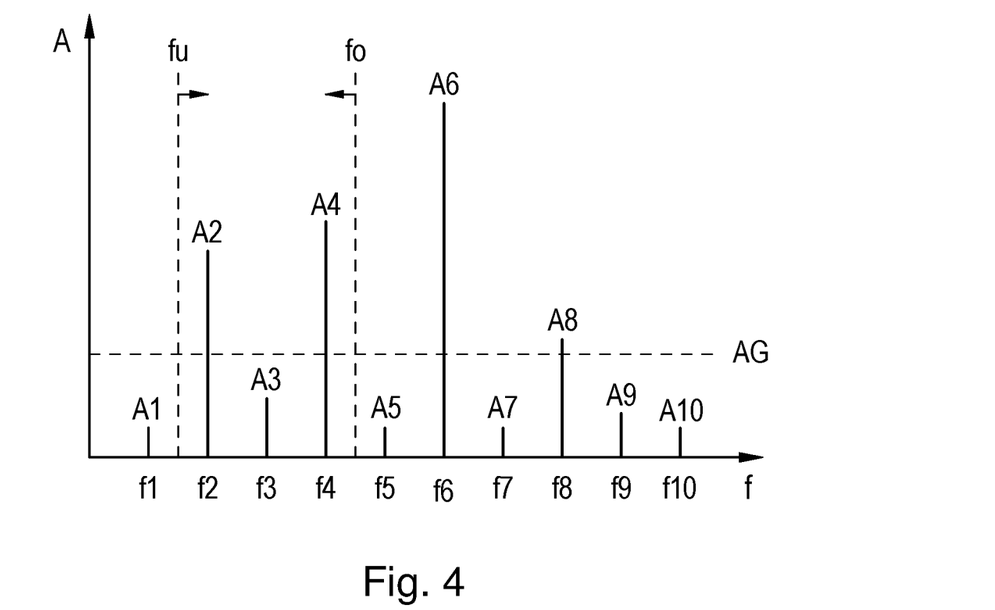
FIG. 4 shows a frequency spectrum illustrating examples of selectable parameters.

In the following, a few examples of selectable parameters will be described with reference to FIG. 4.

By defining a frequency band, for example, by defining a lower limit frequency fu and an upper limit frequency fo, it is possible to selectively analyze the frequency spectrum in one range. This is advantageous if the intention is to monitor a frequency range in which disturbances are expected. If no lower limit frequency fu is specified, then the frequency band is limited by a DC voltage value (fu=0 Hz). If no upper limit frequency fo is specified, then the frequency band is limited by the highest calculable frequency, which is determined by the sampling theorem. In the example shown, result data ED encompasses the frequencies f2, f3 and f4 and the corresponding amplitudes A2, A3 and A4.

A frequency band may also be defined by specifying a center frequency (the mean between upper and lower limit frequencies fo, fu) and a bandwidth (the difference between upper and lower limit frequencies fo, fu) instead of by specifying a lower and an upper limit frequency fo, fu.

The range of results may be limited by further parameters PAR, for example, if the intention is to determine only a number N of frequencies with the largest amplitudes. Accordingly, if N is set to be 2, then the result data encompasses the frequencies f2 and f4 with the amplitudes A2 and A4.

Alternatively or additionally, a limit amplitude AG may be defined via further parameters PAR, so that only frequencies whose amplitudes exceed limit amplitude AG will be determined. In this way, frequency components whose amplitudes are too small to permit a reliable assessment can be excluded from result data ED. In addition, this option may be used to establish whether at all there is an amplitude of the frequency spectrum (in the selected frequency band) that exceeds limit amplitude AG. In this case, a result datum ED containing only one bit suffices. In the example shown, with the proviso that the plotted amplitude limit AG must be exceeded, result data ED in the frequency band between lower limit frequency fu and upper limit frequency fo in turn encompasses the frequencies f2 and f4 with the amplitudes A2 and A4.

In the example, amplitude limit AG is represented in a simplified form by a constant value. However, it may also be provided by any mathematical function. If multiple frequency bands are to be analyzed, it is also possible to assign different amplitude limits AG to different frequency bands. In this way, complex envelopes can be formed and used as a criterion for analysis of the frequency spectrum.

Figure 5:
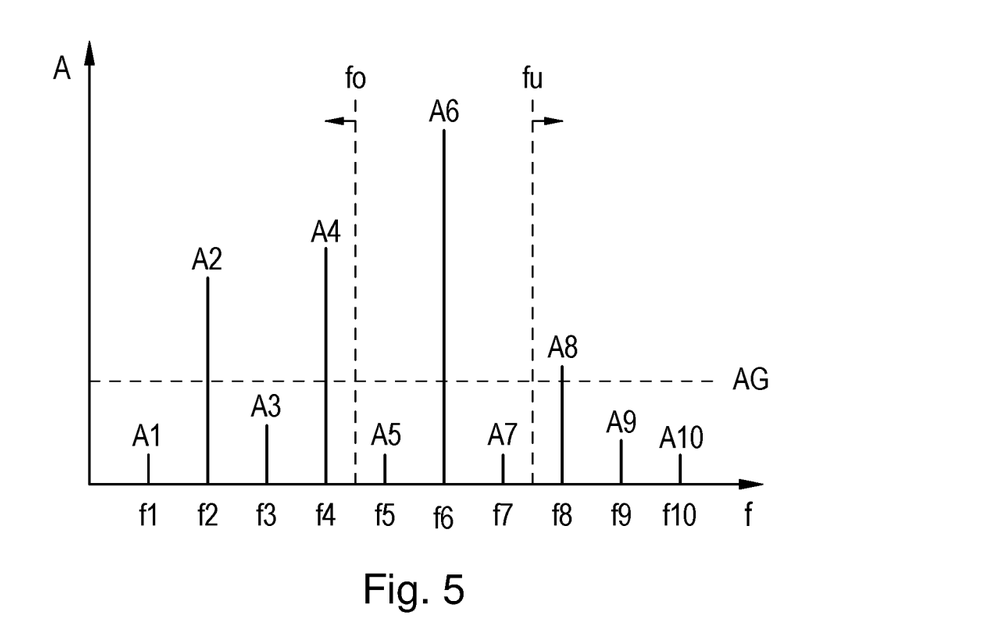
FIG. 5 shows a frequency spectrum illustrating further examples of selectable parameters.

As illustrated in FIG. 5, a frequency band can also be excluded from the analysis if the frequency selected for lower limit frequency fu is higher than that selected for upper limit frequency fo. Thus, in the case of an incremental position-measuring device, for example, the frequency band in which the signal frequency of the position signals lies when the velocity of movement is constant (in the example f6) can be selectively excluded from the analysis, so that only signal peaks resulting from disturbances will be analyzed.

If, rather than individual amplitude values at specific frequencies, the sum of disturbances in the frequency band is of interest for the analysis, one can select, also via a parameter PAR, to calculate a root-mean-square (RMS) of the signal peaks in the frequency band (in accordance with the signal power in the selected frequency band). A combination with the above-described parameters PAR may also be advantageous for this analysis.

In addition, multiple frequency bands can be defined for the analysis, and separate parameters PAR can be set for these frequency bands where necessary.

Moreover, an option may be provided to select and parameterize the analysis method used (the algorithms used) via parameters PAR, for example, by defining the frequency resolution that is used as a basis for the calculation of a frequency spectrum.

If position-measuring device 10 is an angle-measuring device or rotary encoder, it is particularly advantageous if an order spectrum is calculated instead of a frequency spectrum in signal analysis unit 50. This is also a signal analysis in the frequency domain, but in an order analysis, orders (multiples) of the rotational speed of a shaft of position-measuring device 10, or of a shaft whose angular position is measured by position-measuring device 10, are assigned to the lines of the order spectrum. Thus, the order analysis is dependent on rotational speed.

For example, if the shaft is rotating at 3000 rpm, then this corresponds to a rotational speed of 50 Hz (1/s). Thus, the signal peak of the first order corresponds to the signal component of measurement signal M at 50 Hz. The second order is then at 100 Hz, the third order at 150 Hz, and so on.

This analysis method is advantageous because disturbances of measurement signal M are often dependent on rotational speed; i.e., occur at frequencies that are multiples of the rotational speed. Thus, the correlation with the rotational speed makes it easier to identify the cause of the disturbance.

Figure 6:
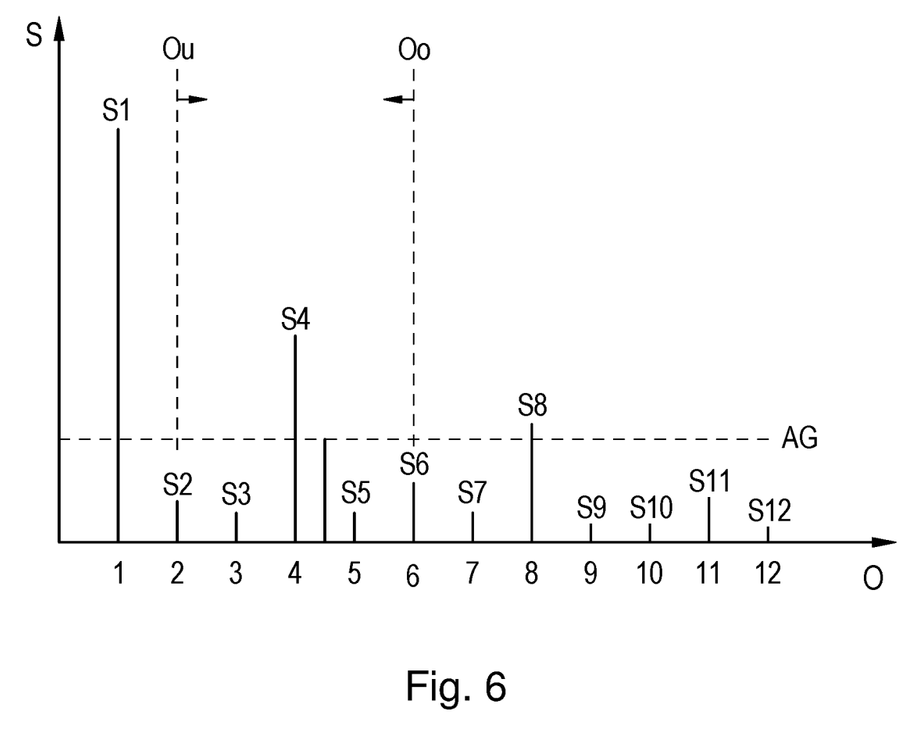
FIG. 6 depicts an order spectrum illustrating examples of selectable parameters.

FIG. 6 shows an example of an order spectrum. Signal component S1 of measurement signal M at the position of the first order has the largest signal amplitude, signal components S4 and S8 of the fourth and eighth orders represent significant spurious components of measurement signal M. In this example, a speed signal is fed as an auxiliary signal H to signal analysis unit 50.

Here too, analogously to the parameters selectable for the frequency spectrum, a bandwidth (a range of orders) can be defined for the orders to be analyzed, limited by a lower order Ou and an upper order Oo, as well as a discretionary limit amplitude AG for the signal amplitude of signal components S1 through S12.

Performing the signal analysis the basis of an order spectrum is advantageous especially in the context of machining of workpieces by a machine tool. In milling, for example, the engagement of tool edges into the workpiece may cause vibrations. The fundamental frequency of these vibrations is dependent on the rotational speed of the tool spindle and the number of cutting edges disposed around the circumference of the milling cutter. Strong vibrations are also referred to as "chatter" and are undesirable because they leave machining marks (known as "chatter marks") on the workpiece. By using an order spectrum in which the range of orders is limited to orders where vibrations are expected (rotational speed of the spindle multiplied by the number of cutting edges), it is possible to generate result data ED including the signal amplitude of the selected order (or orders). Additionally or alternatively, by defining a limit amplitude AG for the selected order (or orders), it is possible to check whether the vibrations exceed the limit amplitude AG.

The parameterizability of the signal analysis in the frequency domain allows flexible adaptation to the machining conditions (rotational speed, tool, rough or finish machining, etc.).

Signal analysis unit 50 may be suitably adapted to perform both frequency analysis and order analysis. The selection of the analysis method to be used can again be made via a parameter PAR.

Figure 7:
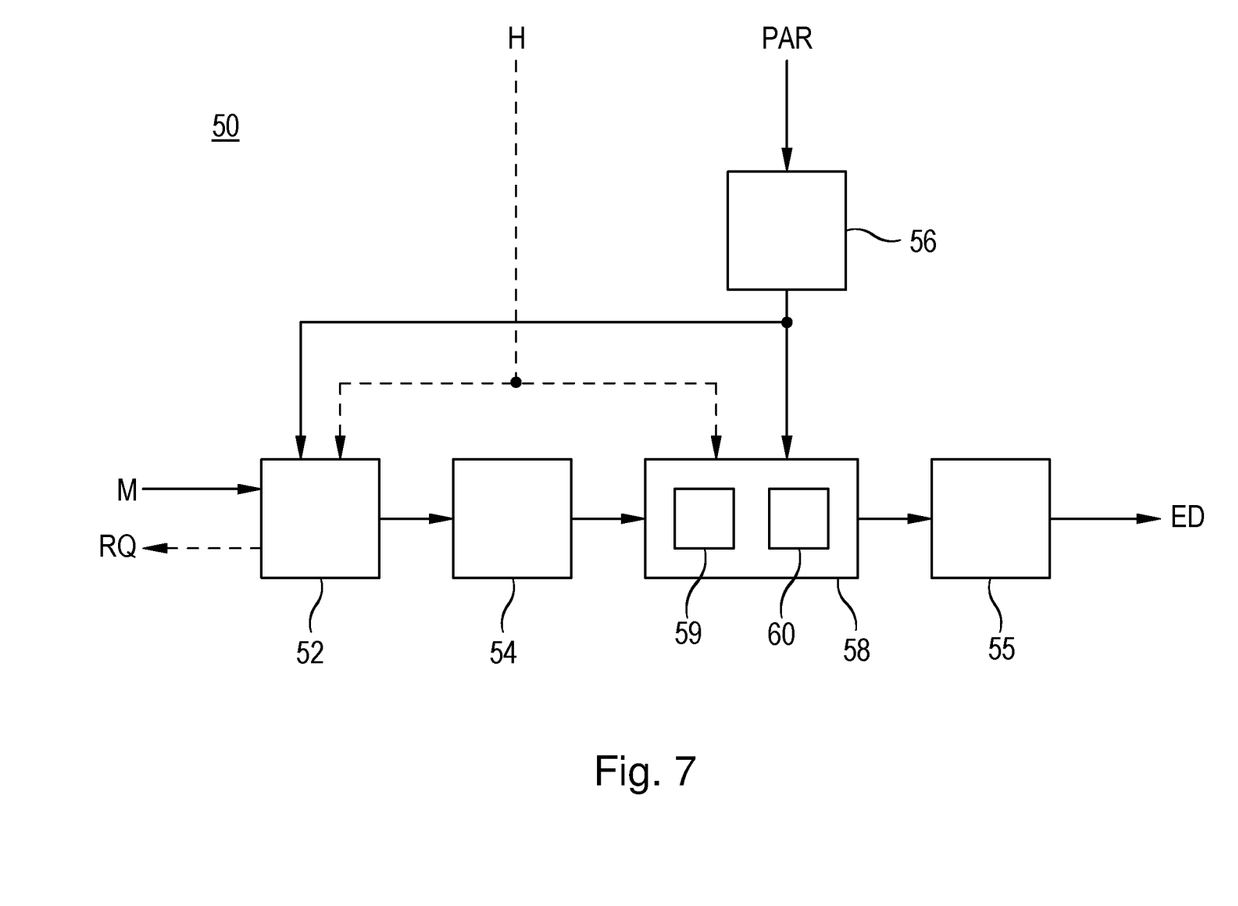
FIG. 7 illustrates a second embodiment of a signal analysis unit.

FIG. 7 illustrates an alternative embodiment of a signal analysis unit 50, which differs from that described with reference to FIG. 3 in the design of arithmetic logic unit 58. In this example, arithmetic logic unit 58 includes a programmable filter 59 and a downstream RMS calculation unit 60.

Programmable filter 59 may be configured as a high-pass, low-pass, band-pass or notch filter. If necessary, the filter function of the filter may be selectable via parameters PAR. As in the preceding example, the frequency band to be analyzed can be set by defining the respective limit frequencies fu, fo (or the center frequency and the bandwidth), also via parameters PAR.

In RMS calculation unit 60, the root-mean-square (RMS) of the filtered data can be determined; i.e., the mean of all disturbances of measurement signal M in the selected frequency band. The root-mean-square provides a result datum ED of this variant of a signal analysis unit 50. Additional programmable filters 59 and RMS calculation units 60 may be provided to allow simultaneous analysis of multiple frequency bands.

In an alternative embodiment, programmable filter 59 is configured as a tracking filter. A tracking filter is a bandpass filter whose center frequency varies with the rotational speed. To this end, a speed signal is fed as an auxiliary signal H to signal analysis unit 50. The center frequency of programmable filter 59 is now defined relative to the frequency of the speed signal, the distance between the center frequency of the speed signal as well as the bandwidth being settable via parameters PAR. This variant makes it possible to analyze speed-dependent disturbances in a manner which is comparable to the above-described method of obtaining an order spectrum, but easier to implement.

The analysis method (filtering and calculation of a root-mean-square) of the variant of a signal analysis unit 50 illustrated in FIG. 7 is less complex and requires less processing power than the analysis methods (frequency analysis, order analysis) of the variants shown in FIG. 3. and, therefore, is advantageous if the intention is to reduce processing power requirements or to avoid power dissipation resulting from intensive computation and associated heat generation in the position-measuring device.

The previously mentioned parameters PAR concern the analysis of measurement signals M and may therefore be referred to as analysis parameters. As illustrated in the preceding examples, analysis parameters may also directly determine the type of result data ED; i.e., whether result data ED is in the form of individual bits, individual values, value pairs, etc.

Besides the analysis parameters, parameters PAR may further include execution parameters that determine when and under which conditions an analysis of measurement signals M will be performed.

For example, the analysis may be initiated by an unconditional or a conditional start command from subsequent electronics 80. In the case of an unconditional start command, the analysis of measurement signals M is initiated without delay. In the case of a conditional start command, initiation is dependent on at least one additional condition, such as, for example, the reaching of a specific absolute position, velocity, etc. An item of information required for this may be fed to signal analysis unit 50, for example via auxiliary signal H, from processing unit 30. If a conditional start command requires information that is not available within position-measuring device 10, then this information may be fed position-measuring device 10 via an external signal.

Moreover, start commands that trigger only a single analysis of measurement signals M can be distinguished from start commands that initiate a continuous analysis. In the latter case, current result data ED will always be available in output memory 55.

In addition, a stop command may be provided which stops the analysis of measurement signals M.

Figure 8:
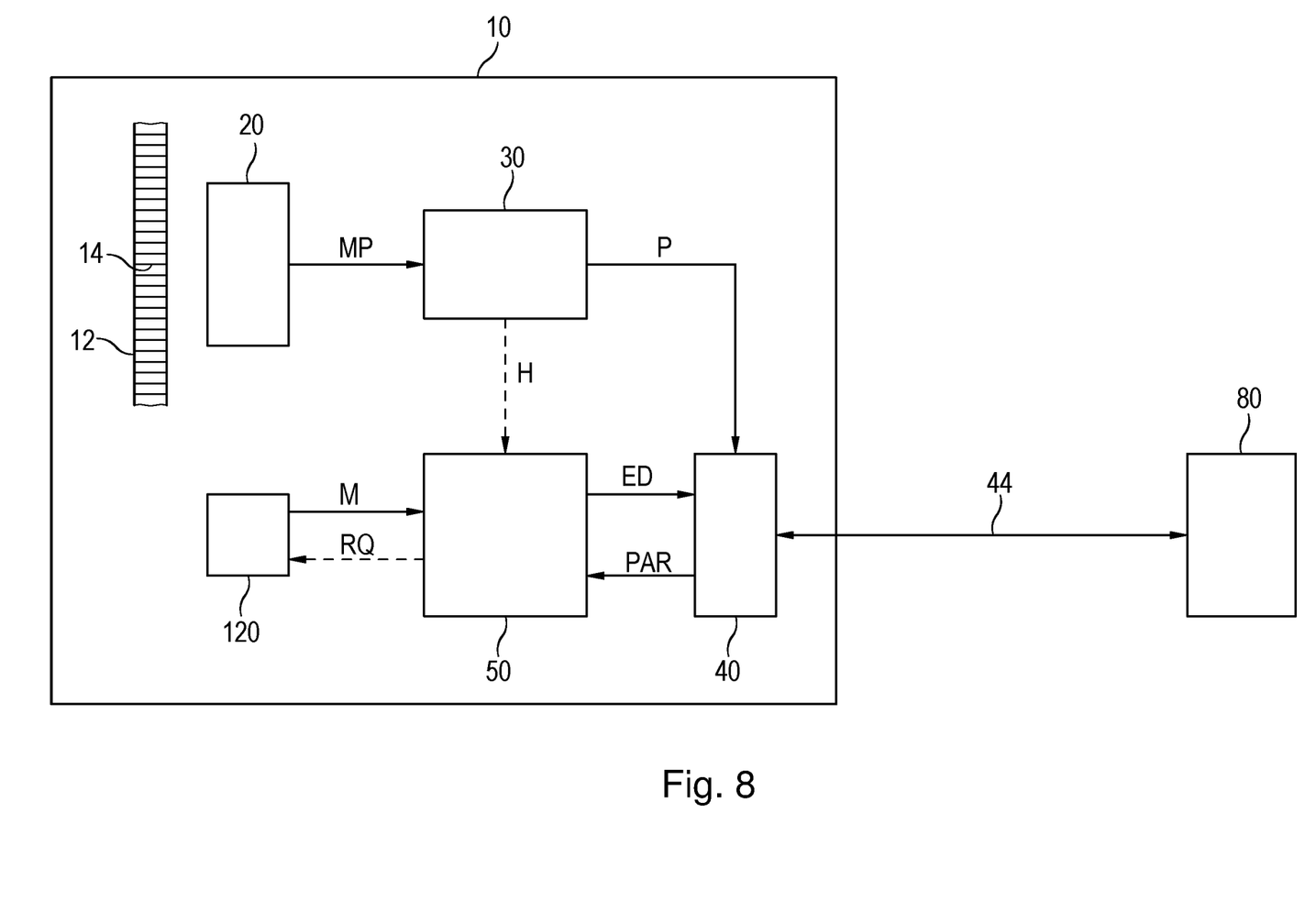
FIG. 8 shows another exemplary embodiment of a position-measuring device according to the present invention.

FIG. 8 shows another exemplary embodiment of a position-measuring device 10 according to the present invention. Components already described in connection with FIG. 1 have been given the same reference numerals. The difference from the preceding exemplary embodiment is that a separate acceleration sensor 120 is used instead of position sensor 20 as a motion sensor. In this exemplary embodiment, position sensor 20 is used solely for position measurement. To this end, position measurement signals MP of position sensor 20 are fed to processing unit 30.

In a particularly advantageous embodiment, acceleration sensor 120 is mechanically connected to a component of position-measuring device 10. This makes it an integral part of position-measuring device 10, and the inventive analysis methods are immediately available once position-measuring device 10 is mounted to the machine or equipment as intended. Acceleration sensor 120 is mounted, for example, within a housing of position-measuring device 10. In the case of a length-measuring device, acceleration sensor 120 may be disposed, for example, in the housing of the scanning head; in the case of a rotary encoder, at a suitable location within the housing that also accommodates graduation carrier 12 and the electronic components for signal processing. In machines having multiple movement axes, such as machine tools or robot arms, acceleration sensor 120 may be used to analyze influences of movement axes other than the movement axis associated with position-measuring device 10 (i.e., the one whose movement is measured by position-measuring device 10) if position-measuring device 10, or the component to which acceleration sensor 120 is mechanically connected, is carried along therewith during positioning operations.

Alternatively, acceleration sensor 120 may also be disposed outside position-measuring device 10 on a machine part to be monitored. The transmission of measurement signals M to position-measuring device 10 or to the analysis electronics included in signal analysis unit 50 is then accomplished via a suitable interface. The signal transmission may be in analog or digital form, wired or wireless (by optical means or via radio signals).

Measurement signals M of acceleration sensor 120 are in turn fed to signal analysis unit 50. These measurement signals M are also time-varying, motion-dependent signals. Therefore, all the insights gained based on FIGS. 2 through 7 are also applicable to this exemplary embodiment, and signal analysis units 50, such as were described with reference to FIGS. 3 through 7, can be employed. Here, too, the parameterizability of signal analysis unit 50 is a decisive advantage for selectively analyzing measurement signal M in a selectable period of time and/or an assigned frequency band.

In particular, if the analysis is to be started as a function of position, an auxiliary signal H containing such position information may be output by processing unit 30 to signal analysis unit 50.

This embodiment is also particularly advantageous when the intention is to analyze vibrations of the machine in the region of position-measuring device 10. The vibrations may result from cogging forces of motors, from the machining of a workpiece, wobbling and imbalance effects, or the like.

Instead of acceleration sensors, it is also possible to employ other sensors that generate motion-dependent measurement signals, such as structure-borne sound sensors or sensors capable of measuring elastic deformations of machine parts.

Figure 9:
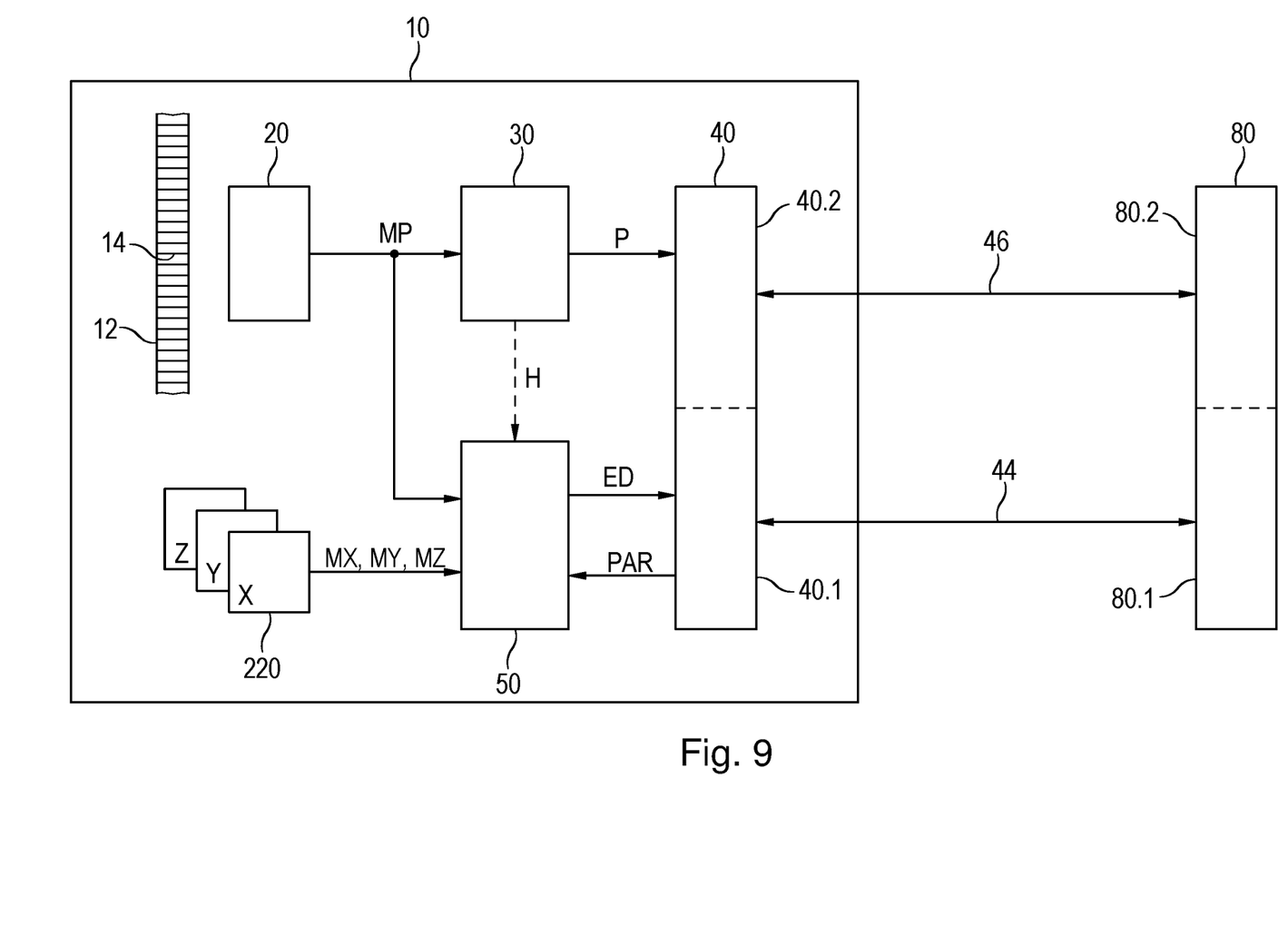
FIG. 9 shows a further exemplary embodiment of a position-measuring device according to the present invention.

FIG. 9 shows another exemplary embodiment of a position-measuring device 10 according to the present invention, which differs from the previous exemplary embodiment, on the one hand, in that it uses an acceleration sensor 220 that measures accelerations in three directions of movement X, Y, Z. Corresponding measurement signals MX, MY, MZ are fed to signal analysis unit 50. On the other hand, as in the first exemplary embodiment, position signals MP are also fed to signal analysis unit 50. Thus, both acceleration sensor 220 and position sensor 20 are motion sensors according to the present invention.

Signal analysis unit 50 is advantageously designed to process measurement signals MX, MY, MZ, MP completely or partially in parallel. If signal analysis unit 50 is one as described with reference to FIG. 3, then, for parallel processing of measurement signals MX, MY, MZ, MP, one data acquisition unit 52, one arithmetic logic unit 58, one input memory 54 and one output memory 55 are provided for each of the signals. If all measurement signals MX, MY, MZ, MP are to be analyzed based on the same parameters, one shared parameter memory 56 suffices. For partially parallel processing, it is expedient to perform data acquisition in parallel and to perform only the calculations successively in a shared arithmetic logic unit 58.

Analogously, a signal analysis unit 50 according to FIG. 7 may also be designed for completely or partially parallel processing. Here, too, it is advantageous to collect the measurement values of measurement signals MX, MY, MZ, MP in parallel and to perform only the calculations successively.

In this exemplary embodiment, communication with subsequent electronics 80 is via two separate data channels 44, 46, which may be configured as digital bidirectional data interfaces. Thus, communication concerning the normal intended operation of position-measuring device 10 (especially the request and transmission of position values P) may be performed via a specialized encoder interface such as, for example, EnDat, whereas the transmission of parameters PAR and result data ED may be performed via another data interface such as, for example, a field bus (ProfiBus, ProfiNet, . . . ). To enable the communication, separate interface modules 40.1, 40.2 may be provided and connected to different modules 80.1, 80.2 of subsequent electronics 80. Modules 80.1, 80.2 may also be separate units (devices).

Since disturbances causing accelerations (vibrations) can now be sensed in three spatial directions, it is now possible to infer the direction from which the disturbance acting on position-measuring device 10 originates. In addition, since position measurement signals MP are also analyzed in signal analysis unit 50, it is further possible to establish a correlation between the disturbance and measurement errors during position measurement. Through adaptation of parameters PAR, it is possible, on the one hand, to select and monitor specific frequency bands and, on the other hand, to determine a start time for the analysis and thereby prevent unnecessary loading of the electronics of position-measuring device 10, which is noticeable by increased power consumption and the resulting heat generation. It is readily apparent here that the parameterizability of the analysis enables machine properties to be analyzed in particularly effective manner.

Figure 10:
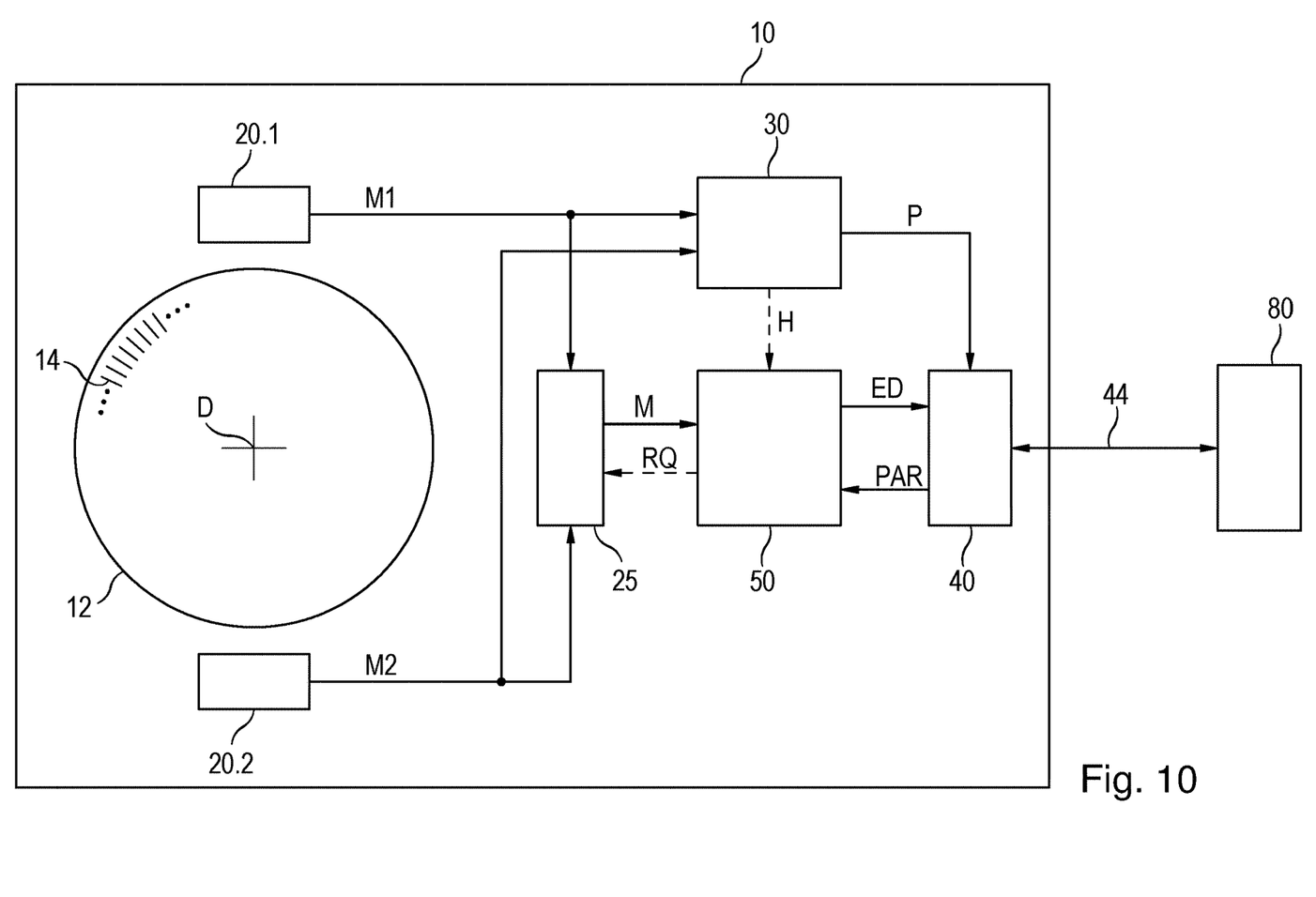
FIG. 10 shows yet another exemplary embodiment of a position-measuring device according to the present invention.

FIG. 10 shows a further exemplary embodiment of a position-measuring device 10 according to the present invention. This position-measuring device 10 is configured as a rotary encoder or angle-measuring device. Accordingly, graduation carrier 12 is a circular disk or a ring rotatably mounted about a center of rotation D. Measuring graduation 14 is arranged concentrically about center of rotation D and is scanned by two position sensors 20.1, 20.2, whose sub-measurement signals M1, M2 are fed to processing unit 30 and processed into position signals P. By scanning measuring graduation 14 at different locations around the circumference (which, in the example, are offset by 180°), it is possible to correct measurement errors resulting from eccentricity and wobbling movements of graduation carrier 12.

In addition to this generally known procedure for correcting position signals P, sub-measurement signals M1, M2 are also fed to a pre-processing unit 25 that processes sub-measurement signals M1, M2 into a measurement signal M. To this end, pre-processing unit 25 advantageously calculates a difference signal between sub-measurement signals M1, M2, which is a measure of the eccentricity and/or wobbling movements of graduation carrier 12. Thus, position sensors 20.1, 20.2, in conjunction with pre-processing unit 25, form a motion sensor according to the present invention.

It is also possible to employ more than two position sensors that are advantageously arranged at regular intervals around the circumference of graduation carrier 12. In particular, in the case of graduation carriers of large diameter, position sensors 20.1, 20.2 may be disposed in separate housings.

The analysis of measurement signals M may be performed using signal analysis units 50 as shown in FIG. 3 or FIG. 7. In this exemplary embodiment, too, multiple analysis methods selectable via parameters PAR may be available in signal analysis unit 50 where necessary.

This exemplary embodiment allows for detailed analysis of eccentricity and/or wobbling movements of graduation carrier 12, which in turn allows conclusions to be drawn about the bearing of a shaft whose rotational movement is measured by position-measuring device 10 and about the manner in which position-measuring device 10 is mounted on this shaft. Combination with design features of the exemplary embodiments according to FIGS. 1, 7, and 8 is possible.

The present invention is of course not limited to the exemplary embodiments described herein, but rather may be implemented by those skilled in the art in an alternative manner within the scope of the claims. In particular, it is possible to employ signal analysis units 50 based on alternative analysis methods that require additional or alterative parameters than those presented in connection with the above exemplary embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
    a graduation carrier having a measuring graduation disposed thereon;
    at least one position sensor configured to generate position-dependent measurement signals by scanning the measuring graduation, wherein the at least one position sensor and/or at least one motion sensor is configured to generate time-varying measurement signals;
    a processor configured to process the position-dependent measurement signals into position signals;
    an interface configured to transmit the position signals to subsequent electronics via at least one data channel; and
    a signal analyzer configured to analyze at least one of the position-dependent and the time-varying measurement signals in the frequency domain dependent on parameters that are transmittable from the subsequent electronics to the interface, and to produce result data that is transmittable from the interface to the subsequent electronics.

2. The position-measuring device as recited in claim 1, wherein the at least one position sensor is configured to generate the position-dependent measurement signals which are time-varying such that the position-dependent measurement signals are the time-varying measurement signals.

3. The position-measuring device as recited in claim 1, wherein the at least one position sensor includes at least two position sensors that are configured to generate sub-measurement signals by scanning the measuring graduation, and a pre-processor configured to process the sub-measurement signals into the position-dependent and/or the time-varying measurement signals.

4. The position-measuring device as recited in claim 1, wherein the at least one motion sensor is provided in addition to the at least one positions sensor, and is an acceleration sensor or a structure-borne sound sensor.

5. The position-measuring device as recited in claim 1, wherein the signal analyzer has a parameter memory configured to store the parameters.

6. The position-measuring device as recited in claim 1, wherein the signal analyzer has a data acquisition unit configured to acquire measurement values of the measurement signals of the at least one position sensor, and an arithmetic logic unit configured to calculate the result data which is dependent on the parameters.

7. The position-measuring device as recited in claim 6, wherein the arithmetic logic unit is configured to perform a frequency analysis of the measurement values.

8. The position-measuring device as recited in claim 6, wherein the signal analyzer is configured to receive an auxiliary signal in the form of a speed signal, and wherein the arithmetic logic unit is configured to perform an order analysis of the measurement values.

9. The position-measuring device as recited in claim 6, wherein the arithmetic logic unit has a programmable filter configured to filter the measurement values, and a root-mean-square (RMS) calculator configured to calculate a root-mean-square from the filtered measurement values.

10. The position-measuring device as recited in claim 1, wherein the at least one position sensor is mechanically connected with another component of the position-measuring device.

11. A method for operating a position-measuring device according to claim 1, the method comprising:
    transmitting the parameters from the subsequent electronics to the position-measuring device;
    determining the result data in the signal analyzer by analyzing at least one of the position-dependent and the time-varying measurement signals in the frequency domain, taking into account the parameters; and
    transmitting the result data to the subsequent electronics.

12. The method as recited in claim 11, wherein the parameters include analysis parameters.

13. The method as recited in claim 12, wherein the parameters include at least one of the following analysis parameters:
    a frequency band;
    a range of orders;
    a limit amplitude;
    a number of result frequencies;
    an analysis method; and
    a filter function of a programmable filter.

14. The method as recited in claim 11, wherein the parameters include execution parameters.

15. The method as recited in claim 14, wherein the parameters include at least one of the following execution parameters:
    an unconditional start command for the analysis of at least one of the position-dependent and the time-varying measurement signals;
    a conditional start command for the analysis of at least one of the position-dependent and the time-varying measurement signals;
    a command to analyze at least one of the position-dependent and the time-varying measurement signals once;
    a command to analyze at least one of the position-dependent and the time-varying measurement signals continuously; and
    a stop command to stop the analysis of at least one of the position-dependent and the time-varying measurement signals.

16. A method for operating a position-measuring device, the method comprising:
    generating position-dependent measurement signals by at least one position sensor scanning a measuring graduation disposed on a graduation carrier;
    processing the position-dependent measurement signals into position signals;
    transmitting the position signals to subsequent electronics via at least one data channel;

generating time-varying measurement signals by the at least one position sensor and/or at least one motion sensor; and transmitting parameters from subsequent electronics to the position-measuring device;

determining result data by analyzing at least one of the position-dependent and the time-varying measurement signals in the frequency domain, taking into account the parameters; and transmitting the result data to the subsequent electronics.

* * * * *